106. COMPOSITIONS, COATING OR PLASTIC.

Patented Dec. 1, 1925.

1,563,506

UNITED STATES PATENT OFFICE.

JOSEPH O. LUTHY, OF SAN ANTONIO, TEXAS, ASSIGNOR TO LUTHY RESEARCH LABORATORY, A CORPORATION OF TEXAS.

RECOVERY AND UTILIZATION OF MATERIALS OF OLD SECONDARY BATTERY PLATES.

No Drawing.   Application filed January 28, 1925. Serial No. 5,376.

*To all whom it may concern:*

Be it known that I, JOSEPH O. LUTHY, a citizen of the Republic of Switzerland, residing at San Antonio, in the county of Bexar and State of Texas, have invented certain new and useful Improvements in the Recovery and Utilization of Materials of Old Secondary Battery Plates; and I do hereby declare the following to be a full, clear, and exact description of the invention, such as will enable others skilled in the art to which it appertains to make and use the same.

This application, which is in part a division of my previous application, Serial No. 695,801, filed February 28, 1924, Patent No. 1,562,714, dated February 17, 1925, is directed to a method of recovering and utilizing the active materials of old secondary battery plates, said method comprising the separation and comminution of the active material from positive and negative plates, mixing the positive and negative materials in such proportions that, when associated with an aqueous binder, viz water or an aqueous solution of certain chemical compounds, and applied to a supporting grid will set up into a relatively hard self-supporting cementitious mass, the pasted plate serving as either a positive plate or a negative plate, according to the relative proportions of the positive and negative recovered materials employed, the resultant plates possessing substantially all of the desirable qualities and characteristics of similar plates made from new materials, with the additional advantages that they are susceptible of taking a new forming charge more effectively than similar plates fabricated with entirely new or original filling materials.

In carrying out the instant invention, the active material of the old battery plates is separated from the grids or supports in the manner described in my application aforesaid, by subjecting the old plates to percussive and attritive forces, separating, grinding and screening the active filling material and utilizing the latter as the filling mass or paste for new grids. Inasmuch as the novelty and utility of the present invention is largely dependent upon the admixture of recovered active material from old positive and negative plates in certain relative proportions, as well as upon the character of the binding medium employed, and the positive or negative character of the plates to be made, the old positive and negative plates may be separately operated upon and the active filling materials separately recovered for subsequent admixture in proper relative proportions, or, when the actual amounts or qualities of the active materials in the old plates can be determined in advance, the necessary proportions of old positive and negative plates to yield the active materials in the desired ratio or proportions to furnish the filling mass for new plates, may be treated together to separate from the grids and recover the active materials therefrom in one operation.

It has been found that the recovered active materials from old secondary battery plates fall into three classes according to the particular use or application of the original batteries, and these materials act differently with different binding media and require to be combined in different relative proportions of positive and negative materials, depending upon the source of the materials and the positive and negative character of the plates to be fabricated therefrom. Material No. 1 includes practically all active material from automobile self-starter batteries; No. 2 that from electric vehicle batteries; and No. 3 that from stationary lighting plant, radio and similar secondary batteries. The constant cycling and particular modes of use of these various types of batteries produce materially different qualities, characteristics and conditions in the active filling material, and, in order to obtain the best results from the utilization of the recovered active material in building up new plates, special attention must be given, first, to the type of plate to be made therefrom, second, to the character of binding medium employed, and third, to the relative proportions of recovered positive and negative active materials.

It has been found that certain specific binding media are effective in causing certain admixtures of recovered active materials to set up into proper and effective cementitious filling masses, when applied to new grids or supports, and the binding media which have proved most satisfactory are, A, an aqueous solution of sodium sulphate, preferably of a concentration indicated by 1050 on the standard hydrometer scale; B, pure water; C, glacial acetic acid and water 1 to 200 parts; and D, glacial acetic acid and water 1 to 1000 parts.

Material No. 1, in the proportions of 70% positive material and 30% negative material for positive plates, and straight negative material for negative plates, when mixed to a paste of proper consistency with solution A, produces practically uniformly good plates, but materials Nos. 2 and 3, in the proportions indicated, are generally unsatisfactory with this particular binding medium.

Materials Nos. 1, 2 and 3, individually, mixed in equal proportions of positive and negative for positive plates, and 15% positive and the remainder negative for negative plates will make an excellent filling mass, when reduced to a proper pasting consistency with binders A, B or D.

The foregoing statements of the specific proportions of recovered active positive and negative materials are, of course, merely exemplary, and are given as producing the best results in the form of durable and efficient secondary battery plates, utilizing recovered active materials from old battery plates, and it will be understood that the proportions of positive and negative active materials may be varied within reasonable and fairly wide limits without impairing the ultimate product. For example, the proportions of the positive material in making up negative plates may be increased beyond the suggested 15% and still produce satisfactory and efficient plates, but requiring a relatively longer time to charge or form the plates ready for service, and similarly, relatively larger proportions of recovered negative material may be utilized in making up new positive plates which are both durable and efficient, but which likewise require a longer time to charge or form them ready for use.

With reference to the variation of percentages of recovered active positive and negative materials, as indicated above, it is desirable, if the negative and positive plates are to be charged together, that the percentage of positive materials in the positive plates be increased, and the percentage of positive material in the negative plates should be correspondingly decreased in order to obtain the best results. It will be understood, therefore, that the purpose of varying the relative proportions of the respective types of recovered active material, is to bring about the result that, when the negative and positive plates are charged together, each type of plate will become fully charged in about the same time. If these precautions are not observed, one type of plate will become fully charged before the other, and then, when the charging operation is continued long enough to finish the charging of the slower plate, the other will be overcharged and injured. Of course, if either the positive or negative plates are to be charged with dummies, the observance of the rule as to the relative proportions of positive and negative materials in the respective types of plates becomes less important and need not, therefore, be strictly adhered to.

The particular advantage of the instant invention is that the method, as described, enables both positive and negative secondary battery plates being made up with the active materials recovered from old battery plates, in various proportions of positive and negative recovered materials, as indicated, and such plates will possess the further desirable attributes or characteristics that the initial charging or forming operation may be effected in a shorter time than is necessary in the case of plates made wholly with new material.

What I claim is:

1. The method of utilizing old lead secondary battery plate material which comprises separating the material from the grids or supports, pulverizing the separated material, and mixing the pulverized materials from positive and negative plates in such proportions that the same combined with an aqueous binder will set up into a relatively hard and self-supporting cementitious mass.

2. The method of utilizing old lead secondary battery plate material which comprises separating the material from the grids or supports, pulverizing the separated material, mixing the pulverized materials from positive and negative plates in such proportions that the same combined with an aqueous binder will set up into a relatively hard and self-supporting cementitious mass, and applying the resulting paste to a supporting grid.

3. The method of utilizing old lead secondary battery plate material which comprises separately removing the active materials from positive and negative plates, pulverizing said active materials, and mixing the respective materials in such proportions that the same combined with an aqueous solution of a binding medium will set up into a relatively hard and self-supporting cementitious mass.

4. The method of utilizing old lead secondary battery plate material which comprises separately removing the active materials from positive and negative plates, pulverizing said active materials, mixing the respective materials in such proportions that the same combined with an aqueous solution of a binding medium will set up into a relatively hard and self-supporting cementitious mass, and applying the resulting paste to a supporting grid.

5. The method of making positive secondary battery plates which comprises admixing the separated, ground and screened filling materials from old lead positive and negative plates in substantially equal proportions, adding thereto an aqueous binding medium of a character to cause the mixture to set up into a relatively hard self-supporting cementitious mass, and applying the resultant paste to a supporting grid.

6. The method of making negative secondary battery plates which comprises admixing the separated, ground and screened filling materials from old lead positive and negative plates in substantially the proportions of 85% positive and 15% negative, adding thereto an aqueous binding medium of a character to cause the mixture to set up into a relatively hard self-supporting cementitious mass, and applying the resultant paste to a supporting grid.

7. A filling material for lead secondary battery plates comprising the recovered active material from old plates in pulverulent form, associated with an aqueous binding medium in such proportions as to cause the mixture to set up into a relatively hard and self-supporting cementitious mass.

8. A filling material for lead secondary battery plates comprising the recovered active material from old plates in pulverulent form, associated with an aqueous solution of a binding medium in such proportions as to cause the mixture to set up into a relatively hard and self-supporting cementitious mass.

9. A filling material for lead secondary battery plates comprising the recovered active material from old plates in pulverulent form, associated with an aqueous solution of acetic acid in such proportions as to cause the mixture to set up into a relatively hard and self-supporting cementitious mass.

10. A filling material for lead secondary battery plates comprising an admixture in predetermined proportions of the recovered active materials from old positive and old negative plates, associated with an aqueous binding medium in such proportions as to cause the mixture to set up into a relatively hard and self-supporting cementitious mass.

11. A lead battery plate comprising a grid and a filler composed of pulverulent recovered active material from old plates and an aqueous binding medium.

12. A lead battery plate comprising a grid and a filler composed of an admixture of pulverulent recovered active material from old positive and old negative plates in predetermined proportions, associated with an aqueous binding medium in such proportions as to cause the mixture to set up into a relatively hard and self-supporting cementitious mass.

13. A lead battery plate comprising a grid and a filler composed of pulverulent recovered active material from old plates and an aqueous solution of acetic acid.

In testimony whereof I affix my signature.

JOSEPH O. LUTHY.